(12) United States Patent
Hong et al.

(10) Patent No.: US 11,927,747 B2
(45) Date of Patent: Mar. 12, 2024

(54) CAMERA MODULE, VEHICLE CAMERA AND MONITORING SYSTEM

(71) Applicant: JIANGXI LIANCHUANG ELECTRONIC CO., LTD., Nanchang (CN)

(72) Inventors: Xiaobai Hong, Nanchang (CN); Kemin Wang, Nanchang (CN); Xihuang Zhang, Nanchang (CN)

(73) Assignee: JIANGXI LIANCHUANG ELECTRONIC CO., LTD., Nanchang (CN)

(*) Notice: Subject to any disclaimer, the term of this patent is extended or adjusted under 35 U.S.C. 154(b) by 827 days.

(21) Appl. No.: 17/023,363

(22) Filed: Sep. 17, 2020

(65) Prior Publication Data

US 2021/0199953 A1 Jul. 1, 2021

Related U.S. Application Data

(63) Continuation-in-part of application No. PCT/CN2020/076471, filed on Feb. 24, 2020.

(30) Foreign Application Priority Data

Dec. 31, 2019 (CN) .......................... 201911424915.4

(51) Int. Cl.
| | |
|---|---|
| *G02B 27/00* | (2006.01) |
| *G02B 7/02* | (2021.01) |
| *H04N 23/52* | (2023.01) |
| *H04N 23/55* | (2023.01) |
| *H05B 3/84* | (2006.01) |

(Continued)

(52) U.S. Cl.
CPC ......... *G02B 27/0006* (2013.01); *G02B 7/021* (2013.01); *G02B 7/026* (2013.01); *G02B 7/028* (2013.01); *H04N 23/52* (2023.01); *H04N 23/55* (2023.01); *H05B 3/84* (2013.01);
(Continued)

(58) Field of Classification Search
None
See application file for complete search history.

(56) References Cited

U.S. PATENT DOCUMENTS

2018/0239105 A1* 8/2018 Lee ........................ H04N 23/55

FOREIGN PATENT DOCUMENTS

| CN | 1247013 A | 3/2000 |
|---|---|---|
| CN | 1378766 A | 11/2002 |

(Continued)

OTHER PUBLICATIONS

WIPO, International Search Report for PCT Application No. PCT/CN2020/076471, dated Sep. 22, 2020.
(Continued)

*Primary Examiner* — Heather R Jones

(57) ABSTRACT

The disclosure provides a camera module, a monitoring system and a vehicle camera, the camera module includes a lens barrel, a first lens and a heating element, the lens barrel includes a light entrance, the first lens is disposed at the light entrance, the first lens includes an image side surface, the heating element directly acts on the image side surface to heat the first lens. By directly applying the heating element to the image side surface of the first lens, the heating element can directly transmit heat energy to the first lens, thereby achieving the effect of defogging and defrosting automatically.

20 Claims, 9 Drawing Sheets

(51) Int. Cl.
    *B60R 11/04*     (2006.01)
    *H04N 7/18*      (2006.01)

(52) U.S. Cl.
    CPC .............. *B60R 11/04* (2013.01); *H04N 7/183* (2013.01); *H05B 2203/008* (2013.01); *H05B 2203/013* (2013.01)

(56) References Cited

FOREIGN PATENT DOCUMENTS

| | | |
|---|---|---|
| CN | 102602344 A | 7/2012 |
| CN | 203716777 U | 7/2014 |
| CN | 104893630 A | 9/2015 |
| CN | 107071944 A | 8/2017 |
| CN | 206650748 U | 11/2017 |
| CN | 107426842 A | 12/2017 |
| CN | 107690594 A | 2/2018 |
| CN | 107728408 A | 2/2018 |
| CN | 107741680 A | 2/2018 |
| CN | 108027548 A | 5/2018 |
| CN | 108028882 A | 5/2018 |
| CN | 108307093 A | 7/2018 |
| CN | 108351486 A | 7/2018 |
| CN | 108700795 A | 10/2018 |
| CN | 108915528 A | 11/2018 |
| CN | 208207345 U | 12/2018 |
| CN | 208956166 U | 6/2019 |
| CN | 208956178 U | 6/2019 |
| CN | 110133946 A | 8/2019 |
| CN | 209435320 U | 9/2019 |
| CN | 111679536 A | 9/2020 |
| CN | 112198744 A | 1/2021 |
| KR | 20180060752 A | 6/2018 |

OTHER PUBLICATIONS

WIPO, Written opinion of the International Search Report for PCT Application No. PCT/CN2020/076471, dated Sep. 22, 2020.
SIPO, First Office Action Issued for CN Application No. 201911424915.4, dated Mar. 29, 2021.
SIPO, Second Office Action issued for CN Application No. 201911424915.4, dated Jul. 12, 2021.
CNIPA, Decision of Rejection for CN Application No. 201911424915.4, dated Nov. 9, 2021.
CNIPA, Notification of Reexamination for CN Application No. 201911424915.4, dated Sep. 20, 2023.

* cited by examiner

CAMERA MODULE, VEHICLE CAMERA AND MONITORING SYSTEM

CROSS REFERENCE TO RELATED APPLICATION(S)

This application is a continuation-in-part of International Application No. PCT/CN2020/076471, filed on Feb. 24, 2020, titled "OPTICAL CAMERA LENS AND IMAGING MODULE". The International Application No. PCT/CN2020/076471 claims priority to a Chinese application NO. 2019114249154 filed on Dec. 31, 2019, titled "OPTICAL CAMERA LENS AND IMAGING MODULE." The entirety of the above-mentioned applications is hereby incorporated by reference herein.

TECHNICAL FIELD

The present disclosure relates to the field of lens imaging technologies, and more particularly, to a camera module, a vehicle camera and a monitoring system.

BACKGROUND

With the popularization of lenses in various industries, the application scenarios are becoming more and more widespread. For lenses used in outdoors, when wet or cold weather is encountered, due to changes in the temperature difference in the use environment, water vapor in the air condenses after encountering cold lenses and forms a layer of fine water droplets, and forms a layer of fog on the surface of the lens, and the phenomenon of fogging occurs; or at sub-zero temperature, the air close to the ground is cooled to below 0° C. due to the influence of the ground's radiative cooling, and it dew on the exposed lens surface becomes frost. These problems will seriously affect the sharpness of the captured image, greatly affect the imaging effect of the lens, and will also cause great safety hazards especially on the vehicle and security equipment.

SUMMARY

Based on this, the present disclosure provides a camera module, an imaging module, a vehicle camera and a monitoring system to solve the above problems.

The embodiments of the present disclosure achieve the foregoing objectives through the following technical solutions:

In a first aspect, the embodiments of the present disclosure provides an camera module, including a lens barrel, a first lens and a heating element, the lens barrel has a light entrance adjacent to an object side, the first lens is disposed at the light entrance and has an image side surface, the heating element acts on the image side surface to heat the first lens.

In a second aspect, the embodiments of the present disclosure further provides an imaging module, including the camera module provided in the first aspect, an imaging element, and a circuit board, the imaging element is disposed on the circuit board, the circuit and the heating element is electrically connected, the imaging element is configured to convert optical images formed by the camera module into electrical signals.

In a third aspect, the embodiments of the present disclosure further provide a vehicle camera, which includes a camera module, an image sensor, a memory and a processor. The memory is configured to store image data, the processor is configured to process the image data. The camera module includes a first lens and a lens group, the lens group is positioned between the first lens and the image sensor, a heating element is provided on an image side surface of the first lens to heat the first lens. The image sensor is opposite to the lens group and configured to sense and generate the image data.

In a fourth aspect, the embodiments of the present disclosure further provides a monitoring system. The monitoring system includes the camera module provided in the first aspect, an image sensor assembly, a memory and a processor. The camera module is coupled to the image sensor assembly and configured to sense and generate image data. The image sensor assembly is connected to the memory and the processor, the memory is configured to store the image data, the processor is configured to process the image data.

Compared with the related art, the present disclosure provides a camera module, a monitoring system and a vehicle camera, by applying the heating element to the image side surface of the first lens, the heating element can directly transmit heat energy to the first lens, thereby achieving the effect of defogging and defrosting automatically in the environment of humidity and low temperature. The defogging and defrosting structure of the camera module and an imaging module provided by the embodiments of the present disclosure has a simple structure and clever design, which makes the camera module and imaging module with low cost, reliable and stable performance and good imaging quality.

These or other aspects of the disclosure will be more concise and understandable in the description of the following embodiments.

DETAILED DESCRIPTION OF PREFERRED EMBODIMENTS

Figure 1:
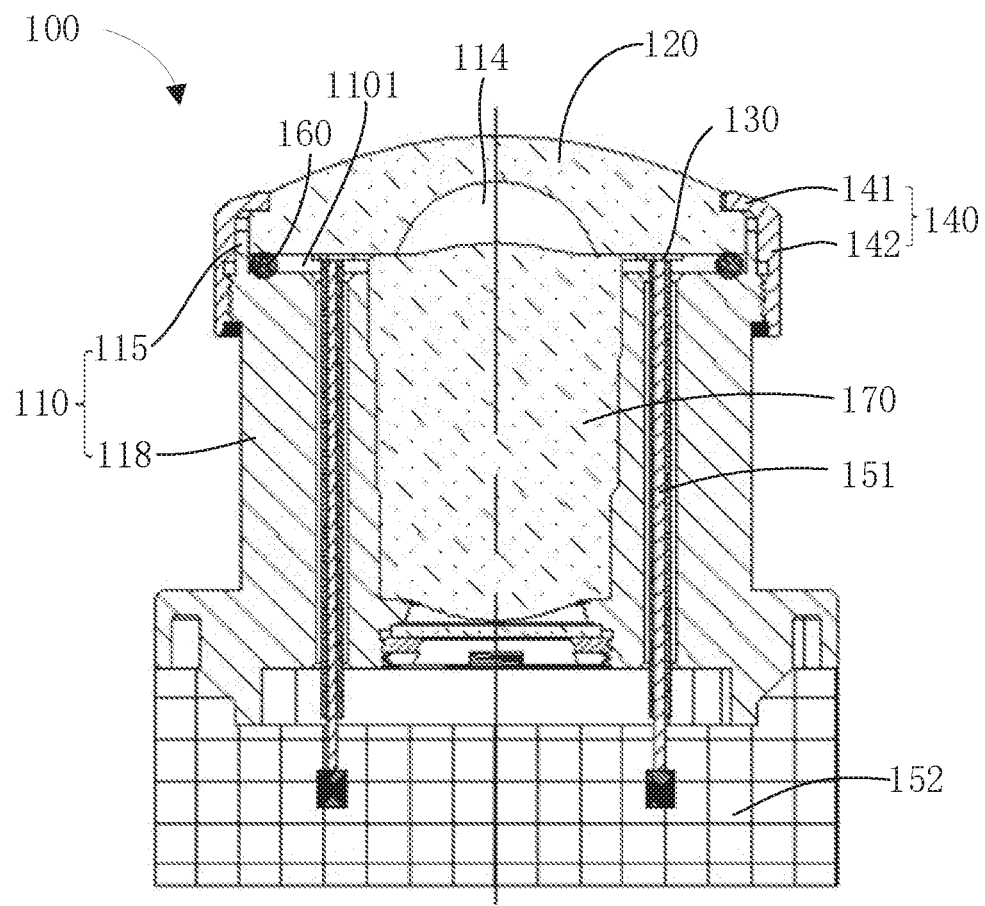
FIG. 1 is a schematic cross-sectional view of a camera module according to a first embodiment of the disclosure.

In order to facilitate a better understanding of the present disclosure, the present disclosure will be further explained below with reference to the accompanying drawings. The embodiments of the present disclosure are shown in the drawings, but the present disclosure is not limited to the above-mentioned preferred embodiments. Rather, these embodiments are provided to make the disclosure of the present disclosure more sufficient.

Unless defined otherwise, all technical and scientific terms used herein have the same meaning as commonly understood by one of ordinary skill in the art to which this disclosure belongs. The terminology used herein in the description of the disclosure is for the purpose of describing particular embodiments only and is not intended to limit the disclosure. The term "and/or" as used herein includes any or all combinations of one or more of the associated listed items.

Please refer to FIGS. 1-5, the present disclosure provides a camera module 100, the camera module 100 includes a lens barrel 110, a first lens 120, a heating element 130, a front cover 140, and a lens group 170. The lens barrel 110 includes a light entrance 116 adjacent to an object side of the camera module 100, the first lens 120 is disposed at the light entrance 116 of the lens barrel 110.

The first lens 120 includes an object side surface 122 facing the object side, an image side surface 121 away from the object side, and a side surface 123 connected between the object side surface 122 and the image side surface 121. The heating element 130 acts on the image side surface 121 directly to heat the first lens 120.

The camera module 100 can be applied to lens systems in many fields such as vehicle lenses, outdoor surveillance, and drones. The camera module 100 enables the heating element 130 to directly act on the image side surface 121 of the first lens 120, the heating element 130 can directly transmit heat energy to the first lens 120, thereby achieving the effect of defogging and defrosting automatically when the camera module 100 is used in humid or low temperature environments. The camera module 100 has a simple structure, which may result in advantages of low cost, reliable and stable performance and good imaging quality.

Figure 4:
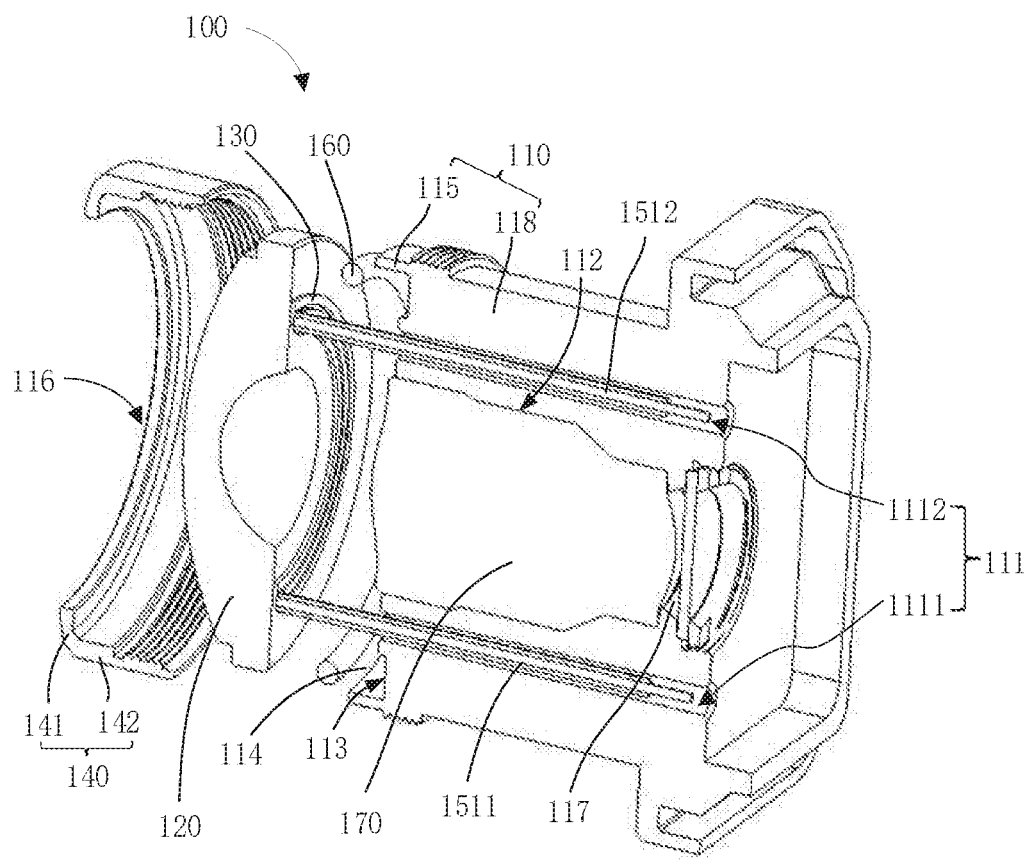
FIG. 4 is an exploded diagram of the camera module, in a cross-sectional view along an axial direction thereof, according to the first embodiment of the disclosure.

Please refer to FIG. 1 and FIG. 4, the light entrance 116 is defined at a position of the lens barrel 110 adjacent to the object side, the first lens 120 is disposed on the lens barrel 110 and adjacent to the light entrance 116. The lens barrel 110 includes a barrel body 118 and a protruding side wall 115 connected with the barrel body 118. The barrel body 118 defines a receiving space 117 for accommodating the lens group 170. That is, the lens group 170 is positioned in the barrel body 118. The barrel body 118 includes an inner surface 112 and an end surface 113. The inner surface 112 may be an inner peripheral surface of the barrel body 118, it encloses and forms the receiving space 117. The end surface 113 is connected with the inner surface 112, the end surface 113 may be equivalent to an inner platform for supporting the first lens 120. In this embodiment, the end surface 113 is flat and perpendicular to an optical axis of the lens group 170, the optical axis of the lens group 170 coincides with a central axis of the receiving space 117. The protruding side wall 115 is disposed around the end surface 113 and protrudes from the end surface 113 toward the object side. The protruding side wall 115 and the end surface 113 together define a first lens mounting cavity 114, the first lens mounting cavity 114 is configured for mounting the first lens 120. In other words, the protruding side wall 115 surrounds and defines the light entrance 116. The first lens 120 is disposed on the barrel body 118, surrounded by the protruding side wall 115, and in contact with the protruding side wall 115. The first lens 120 is opposite to the lens group 170 and is in contact with the lens group 170. An optical axis of the first lens 120 is coaxial with the optical axis of the lens group 170. The height and the thickness of the protruding side wall 115 can be designed or adjusted according to the size of the first lens 120.

Figure 2:
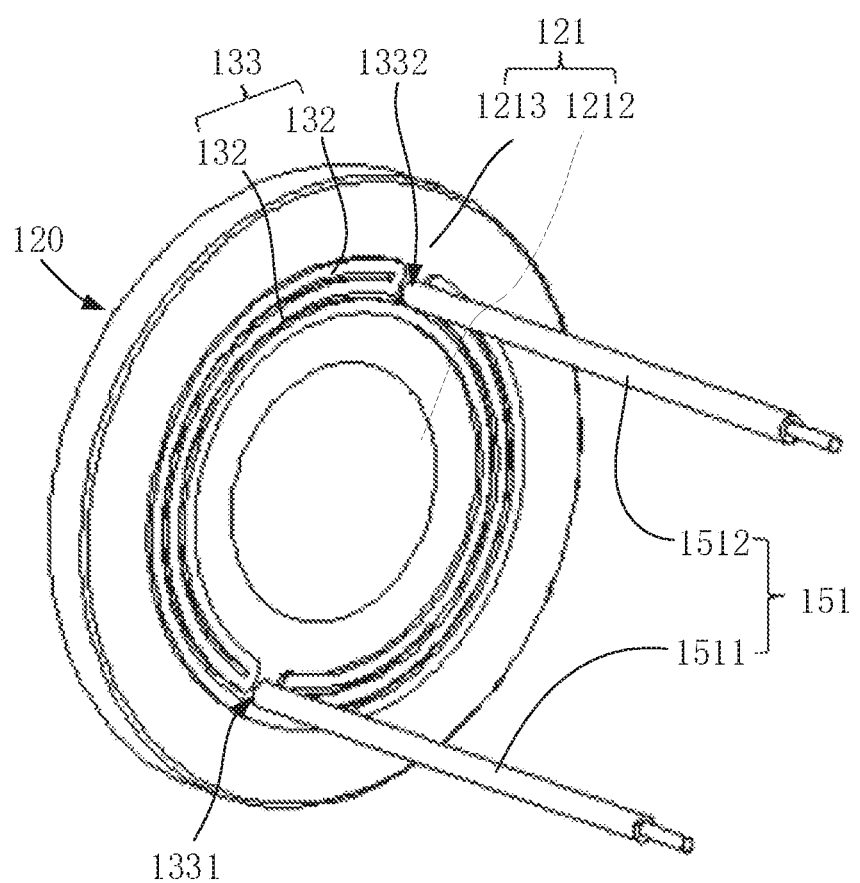
FIG. 2 is a schematic structural diagram of a heating element of the camera module, according to the first embodiment of the disclosure.

Please refer to FIG. 2, the image side surface 121 includes an optical-effective lateral portion 1212 and a non-optical-effective lateral portion 1213 surrounding the optical-effective lateral portion 1212, the optical-effective lateral portion 1212 is a light-passing region configured for optical imaging, the non-optical-effective lateral portion 1213 is an edge region of the first lens 120 and configured for being cooperated with the lens barrel 110 thereby being fixed in the lens barrel 110. The heating element 130 is disposed at the non-optical-effective lateral portion 1213.

Figure 3:
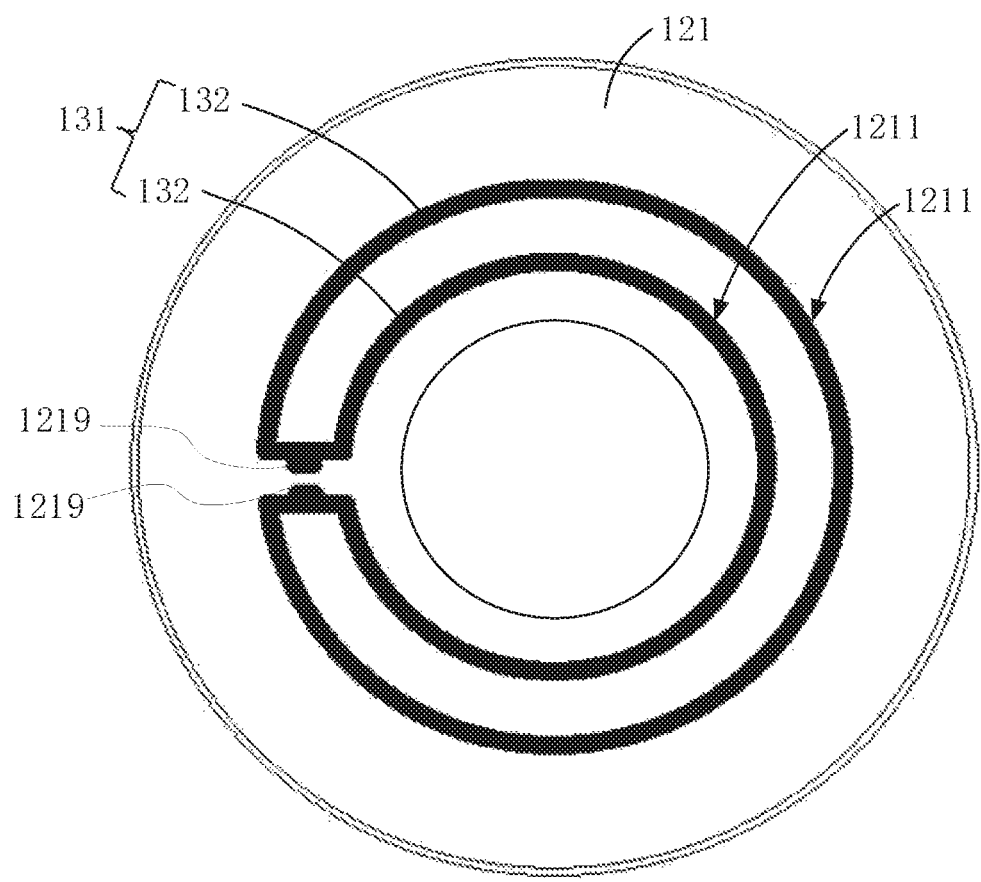
FIG. 3 is a schematic structural diagram of another heating element of the camera module, according to the first embodiment of the disclosure.

Please refer to FIG. 2 and FIG. 3, in this embodiment, the heating element 130 is electrically conductive adhesive 131, the electrically conductive adhesive 131 is attached to the image side surface 121 of the first lens 120, the image side surface 121 includes at least one circular coating area 1211, the coating area 1211 is located at the non-optical-effective lateral portion 1213, the electrically conductive adhesive 131 is coated on the coating area 1211. s an example, the coating area 1211 can be disposed around the optical center of the first lens 120. The shape enclosed by the coating area 1211 may be annular, elliptical, rectangular, or other shapes, it is not limited here. The shape and the area of the coating area 1211 can be set according to actual requirements.

In some embodiments, the electrically conductive adhesive 131 can be coated on the coating area 1211 with equal thickness.

In some embodiments, the electrically conductive adhesive 131 may be coated on the coating area 1211 with different thicknesses, according to actual optical design.

In some embodiments, the at least one circular coating area 1211 includes more than one annular coating areas 1211, coating areas 1211, and the coating areas 1211 are defined around the optical center of the first lens 120. Each of the coating areas 1211 has different radii, and the electrically conductive adhesive 131 may be coated on each of the coating areas 1211, the electrically conductive adhesive 131 coated on two adjacent coating areas 1211 are connected with each other. For example, the electrically conductive adhesive 131 may be coated along half or more of a circumference of every coating area 1211, the electrically conductive adhesive 131 coated on every coating area 1211 has two ends and there is an interval formed between the two ends. Corresponding ends of the electrically conductive adhesive 131 coated on two adjacent coating areas 1211 are connected to each other thereby to form two contact terminals 1219, as illustrated in FIG. 3. The two contact terminals 1219 can be connected to a power supply to form a closed current loop. After the electrically conductive adhesive 131 is powered on, the electrically conductive adhesive 131 can evenly transmit heat energy generated by itself to the first lens 120.

In other words, the electrically conductive adhesive 131 may be coated on the coating areas 1211 and cured thereby forming more than one circular conductive adhesive stripes 132, each conductive strip 132 is in contact with the image side surface 121, the conductive adhesive stripes 132 are substantially parallel with and spaced from each other. The ends of two adjacent conductive adhesive stripes 132 are electrically connected, so the conductive adhesive stripes 132 are electrically connected with each other.

As illustrated in FIG. 2, the heating element 130 includes an annular heating portion 133 in contact with the image side surface 121, the annular heating portion 133 may include a plurality of conductive adhesive stripes 132. That is, the annular heating portion 133 is formed by curing the electrically conductive adhesive 131. The annular heating portion 133 includes two heating terminals, i.e., a first heating terminal 1331 and a second heating terminal 1332.

The electrically conductive adhesive 131 can be directly applied on the image side surface 121 of the first lens 120 by means of UV curing or heat curing. That is, the electrically conductive adhesive 131 is in contact with the image side surface 121. After curing, the electrically conductive adhesive 131 are fixedly attached on the image side surface 121 thereby forming an integral component without affecting other components. This fixing method is simple and firm, and the electrically conductive adhesive 131 is not easy to fall off. The electrically conductive adhesive 131 at least has characteristics of excellent conductive properties, strong adhesion, low resistance, high temperature resistance, and solderability. The use of the electrically conductive adhesive 131 as the heating element 130 of the first lens 120 makes the camera module 100 at least has advantages of simple in structure, small space, low cost, direct heating, and reliable and stable performance.

By directly attaching the electrically conductive adhesive 131 to the image side surface 121 of the first lens 120, the electrically conductive adhesive 131 can directly transmit heat energy to the first lens 120 to heat up the first lens 120, does not affect other components of the camera module 100. Such a structure is especially suitable for cameras including various stacked lenses, the heating element 130 can always be attached to the image side surface 121 of the first lens 120 to heat it, without causing the heating element 130 to loose from the first lens 120. Compared with solutions of adding a detachable heating element between the first lens 120 and the lens group 170, the camera module 100 provided in this embodiment can reduce manufacturing tolerances as much as possible and facilitates the assembly, further the thermal contact between the heating element 130 and the first lens 120 is stable and reliable. In addition, the camera module 100 may have better defogging and defrosting effects and better imaging quality, can avoid the problem that the cumulative error of the stacking assembly between the detachable heating structure and the first lens is too large and the problem of poor contact between the heating element and the first lens 120 caused by the heating element loosens over time after assembly, these problems may affect the defogging and defrosting effect, and even cause poor imaging of the camera module due to stacking interference.

In some embodiments, the electrically conductive adhesive 131 may be adhered to the first lens 120 by bonding, or may be directly and tightly adhered to the image side surface 121 of the first lens 120.

In this embodiment, as shown in FIG. 1, FIG. 3 and FIG. 4, the heating element 130 further includes one or more electrical conductors 151, and the electrical conductors 151 are made of electrically conductive material. e.g., a metal wire. The one or more electrical conductors 151 are used to connect a circuit board 152 and the electrically conductive adhesive 131. The electrically conductive adhesive 131 is energized through a temperature control system circuit of the circuit board 152 to achieve the heating effect. The temperature of the electrically conductive adhesive 131 can be controlled by the temperature control system circuit, according to the external environment temperature, and then the heat energy generated by the electrically conductive adhesive 131 is transmitted to the first lens 120, thereby achieving the effect of defogging and defrosting automatically in humid and low temperature environments.

Specifically, the one or more electrical conductors 151 include a first conductive column 1511 and a second conductive column 1512, correspondingly, the circuit board 152 includes a positive terminal 1521 and a negative terminal 1522, the first conductive column 1511 is electrically connected between the first heating terminal 1331 and the positive terminal 1521, and the second conductive column 1512 is electrically connected between the second heating terminal 1332 and the negative terminal 1522.

In some embodiments, the material of the electrically conductive adhesive 131 is required to meet the power and the impedance limited by the temperature control system circuit of the camera module 100, a corresponding thickness of the electrically conductive adhesive 131 can be designed according to the required function and impedance. The thickness of the electrically conductive adhesive 131 can be controlled by screen printing.

In some embodiments, as shown in FIG. 4, the lens barrel 110 may be provided with at least one mounting hole 111, and the mounting hole 111 penetrates through the lens barrel 110. For example, the mounting hole 111 is provided along an axial direction of the lens barrel 110, and the mounting hole 111 can be used for accommodating the electrical conductor 151. The electrical conductor 151 passes through the mounting hole 111 and electrically connects to the electrically conductive adhesive 131 (i.e., the annular heating portion 133 or the conductive adhesive stripes 132) and the circuit board 152, so as to achieve a connection between the heating element 130 and the temperature control system circuit of the circuit board 152.

Specifically, a central axis of the at least one mounting hole 111 is parallel to a central axis of the receiving space 117, and the central axis of the receiving space 117 is coaxial with an optical axis of the lens group 170. The at least one mounting hole 111 includes a first mounting hole 1111 and a second mounting hole 1112 located at two opposite sides of the receiving space 117, a central axis of the first mounting hole 1111 is parallel to a central axis of the second mounting hole 1112. The first mounting hole 1111 and the second mounting hole 1112 both penetrate through the barrel body 118 in the direction parallel to the optical axis of the first lens 120. The first conductive column 1511 extends through the first mounting hole 1111 and is coupled between the first heating terminal 1331 and the positive terminal 1521. The second conductive column 1512 extends through the second mounting hole 1112 and is coupled between the second heating terminal 1332 and the negative terminal 1522.

Please refer to FIG. 1 and FIG. 4, the front cover 140 is engaged with the lens barrel 110 and the first lens 120, and configured to provide a pressing force to the first lens 120 and the heating element 130. That is, the front cover 140 is configured for fixing (e.g., locking) the first lens 120 to be positioned at the light entrance 116 of the lens barrel 110. The front cover 140 is disposed adjacent to the object side of the lens barrel 110 and is mounted on the lens barrel 110.

The front cover 140 substantially includes a front portion 141 and a side portion 142 connected to the front portion 141. The protruding side wall 115 is sandwiched between the side portion 142 and the side surface 123 of the first lens 120, the front portion 141 is in contact with a peripheral portion of the object side surface 122 of the first lens 120. Most of the object side surface 122 of the first lens 120 is exposed from the front cover 140, the first lens 120 can be fixed between the front cover 140 and the lens barrel 110 under the pressure or the locking force from the front cover 140. The front cover 140 can be detachably connected to the lens barrel 110, for example, it is sleeved on an outer peripheral wall of the lens barrel 110 by screw.

In some embodiments, as shown in FIG. 1 and FIG. 4, the camera module 100 may further include a seal ring 160, the seal ring 160 can be disposed between the first lens 120 and the lens barrel 110, wherein the seal ring 160 can be disposed at the edge of the image side surface 121 of the first lens 120. When the front cover 140 fixes the first lens 120 to the light entrance 116 of the lens barrel 110, the seal ring 160 is deformed by being squeezed by the first lens 120 and the lens barrel 110 simultaneously, the deformed seal ring 160 is intimately attached between the image side surface 121 of the first lens 120 and the end surface 113 of the lens barrel 110. The seal ring 160 performs the function of sealing the first lens 120 and the barrel lens 110 to prevent external moisture from entering into the camera module 100, so that it can effectively prevent mist formed on the first lens 120 and blurred imaging caused thereby. In addition, in some embodiments, the seal ring 160 can also be directly sleeved on an outer peripheral wall of the first lens 120, that is, the seal ring 160 can be intimately attached between the side surface 123 of the first lens 120 and the protruding side wall 115 of the lens barrel 110.

Figure 5:
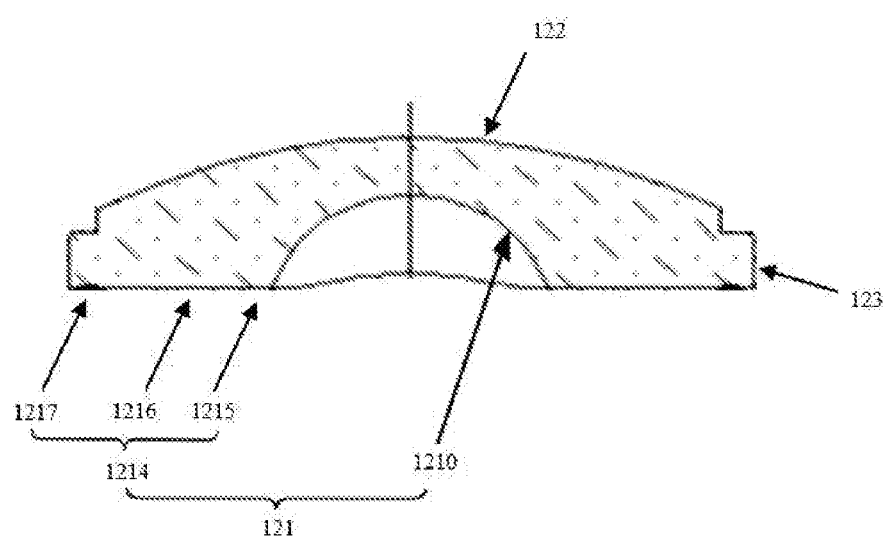
FIG. 5 is a schematic cross-sectional view of a first lens of the camera module, according to the first embodiment of the disclosure.

In other words, as illustrated in FIG. 5, the image side surface 121 includes a curved surface 1210 and an annular flat surface 1214 perpendicular to the optical axis of the first lens 120, the heating element 130 is attached to the annular flat surface 1214. A gap 1101 is defined between the annular flat surface 1214 and the end surface 113. The annular flat surface 1214 sequentially includes an engaging portion 1215, a heating portion 1216 and a periphery portion 1217 along a direction from the curved surface 1210 toward the external. The lens group 170 is opposite to the curved surface 1210 and is in contact with the engaging portion 1215. The optical-effective lateral portion 1212 may be constituted by the curved surface 1210, or may consist the curved surface 1210 and the engaging portion 1215. That is, the non-optical-effective lateral portion 1213 at least includes the heating portion 1216 and the periphery portion 1217. The heating element 130 is in contact with the heating portion 1216, the heating portion 1216 is connected and located between the engaging portion 1215 and the periphery portion 1217. The heating portion 1216 constitutes the coating area 1211. The periphery portion 1217 is spaced apart from the end surface 113 and engaged with the seal ring 160. That is, the seal ring 160 is compressed between the periphery portion 1217 of the first lens 120 and the end surface 113 of the barrel body 118. The heating element 130 is exposed in the gap 1101 and not in contact with the barrel body 118 and the lens group 170.

Please refer to FIG. 6 to FIG. 9, a second embodiment of the disclosure provides a camera module 200, including a lens barrel 110, a first lens 120, a heating element 230, a front cover 140 and a lens group 170. The structure of the camera module 200 provided in this embodiment is similar to the structure of the camera module 100 provided in the first embodiment, except that the structure of the heating element 230 is different from that of the heating element 130, and the lens barrel 110 has a different structure for engaging with the heating element 230.

The front cover 140 is disposed on an object side to provide a pressing force to the first lens 120 and the heating element 230, the front cover 140 is configured for fixing (e.g., locking) the first lens 120 to the light entrance 116 of the lens barrel 110. The front cover 140 is disposed on the object side of the lens barrel 110 and the front cover 140 is fixed to the lens barrel 110 to lock the first lens 120 to the lens barrel 110.

In this embodiment, the heating element 230 includes a heating film 232 and a buffer layer 231. The heating film 232 may be attached to an image side surface 121 of the first lens 120 directly, or may be adhered to the image side surface 121. The buffer layer 231 is attached between the heating film 232 and a barrel body 118 of the lens barrel 110. Both the heating film 232 and the buffer layer 231 may be annular, the heating film 232 can be attached to a non-optical-effective lateral portion 1213 of the image side surface 121, the buffer layer 231 is disposed on the barrel body 118 of the lens barrel 110, the buffer layer 231 can be made of a material with elastic or buffering effects. For example, the buffer layer 231 may be a compressed foam, and the heating film 232 may be a Flexible Printed Circuit (FPC) heating film.

Figure 7:
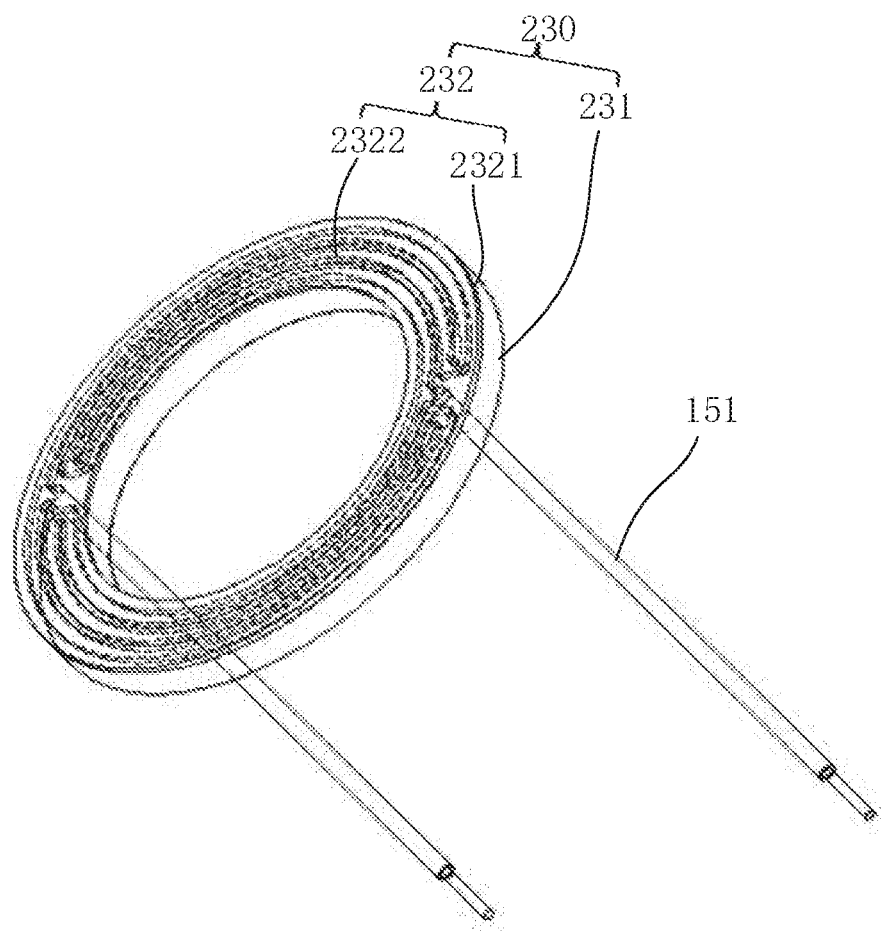
FIG. 7 is a schematic structural diagram of a heating element of the camera module according to another embodiment of the present disclosure.

As illustrated in FIG. 7, the heating film 232 may be the FPC heating film, the FPC heating film is a thin and soft flat heating element composed of electrically insulating material and heating resistor material. The FPC heating film can be formed by etching or printing resistors on a heating film and heat-sealing with insulating materials under high temperature and high pressure, and then performing a lead bonding processing. After that, it can be used in cooperated with a temperature controller.

Figure 8:
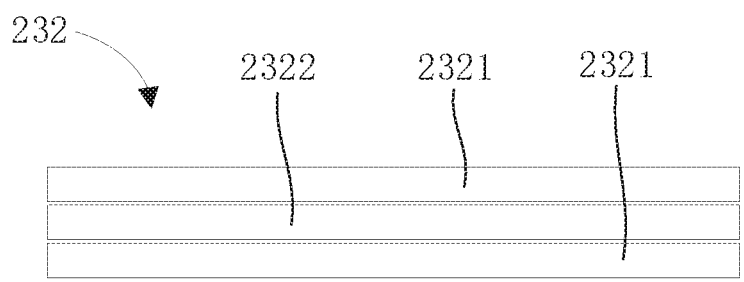
FIG. 8 is a schematic structural diagram of a heating film of the heating element of the camera module according to another embodiment of the present disclosure.

The heating film 232 may include one or more electrical insulating films 2321 and a heating resistor layer 2322. The electrical insulating film 2321 may be attached to the image side surface 121 of the first lens 120, the heating resistor layer 2322 is disposed on the electrical insulating film 2321. The electrical insulating film 2321 can be a polyimide film, and the heating resistor layer 2322 can be formed by setting one or more heating resistor wires on a surface of the electrical insulating film 2321, and the heating resistor layer 2322 can be provided by etching or printing. As illustrated in FIG. 8, the heating film 232 may include two electrical insulating films 2321, and the heating resistor layer 2322 is disposed between the two electrical insulating films 2321.

Figure 6:
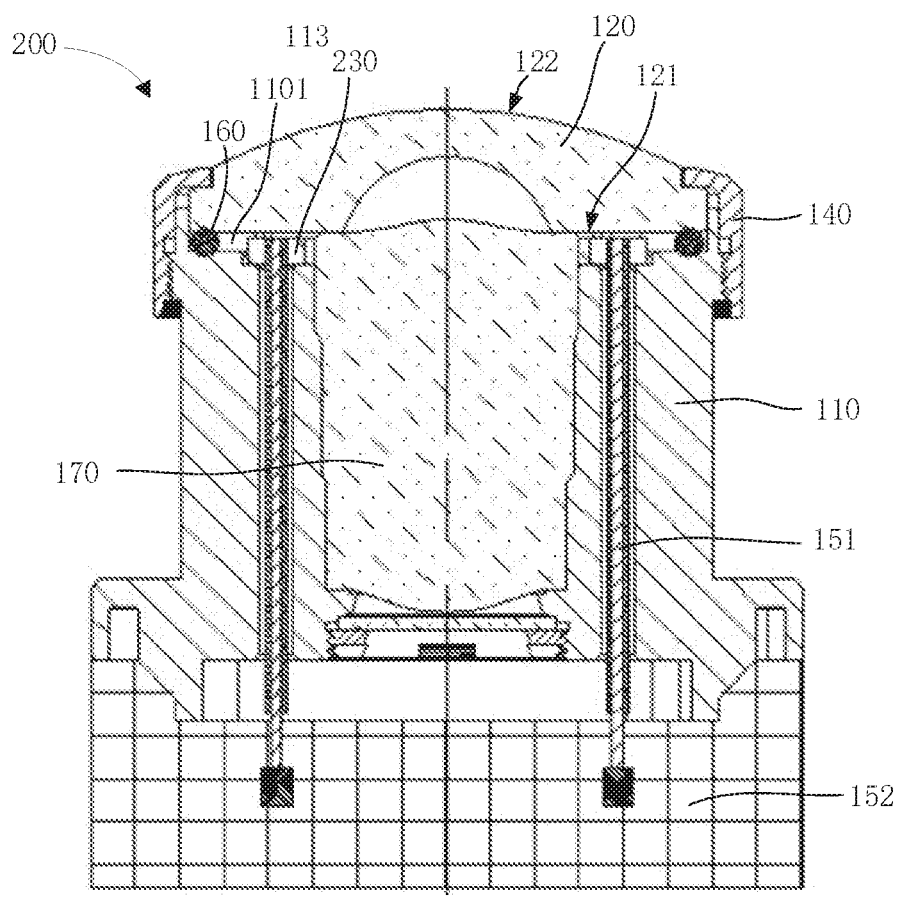
FIG. 6 is a schematic cross-sectional view of a camera module, according to another embodiment of the disclosure.
Figure 9:
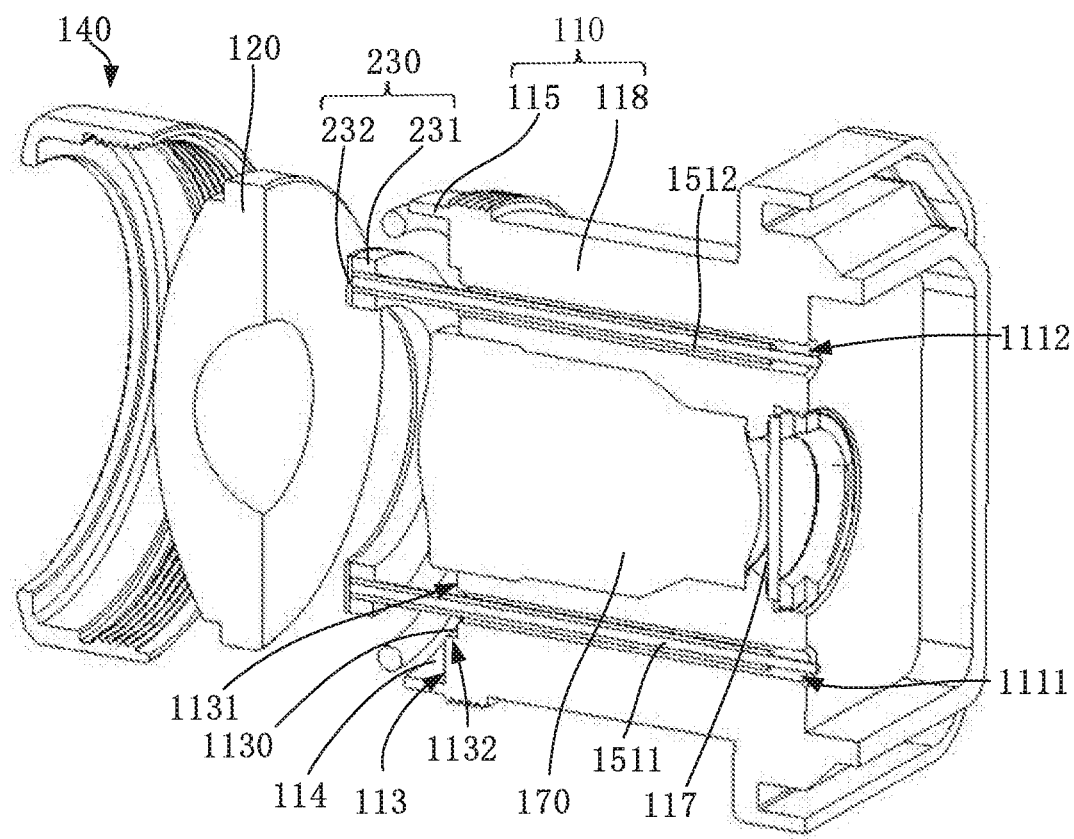
FIG. 9 is an exploded diagram of the camera module, in a cross-sectional view along an axial direction thereof, according to the second embodiment of the disclosure.

In some embodiments, as illustrated in FIG. 6 and FIG. 9, the lens barrel 110 includes the barrel body 118 and a protruding side wall 115. The barrel body 118 includes an end surface 113 substantially perpendicular to an optical axis of the lens group 170. The lens barrel 110 defines a first lens mounting cavity 114, a heating element mounting cavity 1130 and a receiving space 117. The heating element mounting cavity 1130 are positioned between and in communication with the first lens mounting cavity 114 and the receiving space 117. The first lens 120 are mounted in the first lens mounting cavity 114. The heating element 230 are mounted in the heating element mounting cavity 1130. The lens group 170 is received in the receiving space 117. The barrel body 118 includes an end surface 113, a supporting surface 1131 and a connecting surface 1132, the end surface 113 is parallel to the supporting surface 1131, the connecting surface 1132 is connected between the end surface and the supporting surface 1131. The connecting surface 1132 is substantially parallel to an optical axis of the first lens 120, the optical axis of the first lens 120 is coaxial with an optical axis of the receiving space 117 and the lens group 170. The end surface 113 and the supporting surface 1131 are perpendicular to the connecting surface 1132. The protruding side wall 115 protrudes from the end surface 113 toward the object side. The protruding side wall 115 surrounds the end surface 113, and the first lens mounting cavity 114 is defined and surrounded by the protruding side wall 115 and the end surface 113. The connecting surface 1132 surrounds the supporting surface 1131, and the heating element mounting cavity 1130 is defined and surrounded by the connecting surface 1132 and the supporting surface 1131. A diameter of the first lens mounting cavity 114 is greater than that of the heating element mounting cavity 1130.

In some embodiments, the first lens 120 is fixed (e.g., locked) to the lens barrel 110 by the front cover 140. The detachable connection between the front cover 140 and the lens barrel 110 is beneficial for controlling the magnitude of the pressure on the buffer layer 231. The buffer layer 231 is squeezed by both of the first lens 120 and the lens barrel 110 and undergoes a certain deformation, so that the buffer layer 231 can be attached to the end surface 113 of the lens barrel 110 and the heating film 232 closely, meanwhile, the heating film 232 is tightly attached to the image side surface 121 of the first lens 120 to prevent the heating film 232 and the first lens 120 from detaching. The front cover 140 can be screwed or buckled to the lens barrel 110 to further achieve the pressing and positioning of the buffer layer 231, so that the heating film 232 can be closely attached to the image side surface 121 of the first lens 120 to make the heating film 232 has no moving space relative to the first lens 120, the heating film 232 is tightly attached to the first lens 120 and is not easy to fall off.

The heating element 230 is disposed on the image side surface 121 of the first lens 120, and does not affect other components of the camera module 200, it is particularly suitable for structures stacked by various lenses, the cumulative error of stacked lenses is not needed to be considered, so it has advantages of simple structure and convenient assembly. In some embodiments, the heating film 232 may also be directly adhered to the image side surface 121 of the first lens 120, and the buffer layer 231 may be attached between the supporting surface 1132 and the heating film 232, the heating film 232 can be more tightly adhered to the buffer layer 231 and the first lens 120 under the locking force of the front cover 140.

In this embodiment, the heating element 230 further includes one or more electrical conductors 151. The electrical conductor 151 is configured to connect a circuit board 152 and the heating film 232. The heating film 232 is electrically connected to the circuit board 152 through the electrical conductor 151. The one or more electrical conductor 151 includes a first conductive column 1511 and a second conductive column 1512.

In some embodiments, the lens barrel 110 may be provided with one or more mounting holes 111, and the mounting hole 111 penetrates through the barrel body 118 of the lens barrel 110. Specifically, the one or more mounting holes 111 are exposed from the supporting surface 1131 and in communication with the heating element mounting cavity 1130. Correspondingly, the one or more mounting holes 111 includes a first mounting hole 1111 and a second mounting hole 1112. The electrical conductor 151 penetrates through the mounting hole 111 and connects to the heating element 230 and the circuit board 152 to realize the connection between the heating element 230 and a temperature control system circuit of the circuit board 152, the heating film 232 is controlled by the temperature control system circuit of the circuit board 152 to generate heat. The FPC heating film at least has advantages of rapid temperature rise, uniform heating, small size, low cost, reliable and stable performance. The FPC heating film is used as the heating element 230 of the first lens 120, which makes the camera module 200 has at least the advantages of simple in structure, small space, low cost, direct heating, and reliable and stable performance. A longitudinal direction first conductive column 1511 is parallel to the optical axis of the first lens 120.

The camera module 200 provided in the disclosure can be applied to lens systems in many fields such as vehicle lenses, outdoor surveillance, and drones. By attaching the heating element 230 to the image side surface 121 of the first lens 120, so that the heat energy can be directly transferred to the first lens 120, thereby achieving the effect of defogging and defrosting automatically in humid and low temperature environments. Meanwhile, the combination of the first lens 120 and other components may not be affected, and the camera module 200 is particularly suitable for lenses with various lens stacking structures. The heating film 232 is always attached to the image side surface 121 of the first lens 120 to heat it, the buffer layer 231 has deformation and rebound function. When the first lens 120 is fixed to the lens barrel 110, the buffer layer 231 is squeezed and deformed to make the heating film 232 to be in closer contact with the first lens 120. The buffer layer 231 is closely attached to the lens barrel 110 to make the heating film 232 has no moving space relative to the first lens 120 and does not cause the loosen between the heating film 232 and the first lens 120.

The camera module 200 may further includes a seal ring 160, the seal ring 160 is positioned between a peripheral portion of the image side surface 121 and the end surface 113 of the lens barrel 110. A gap 1101 is defined between the first lens 120 and the barrel body 118 of the lens barrel 110.

Figure 10:
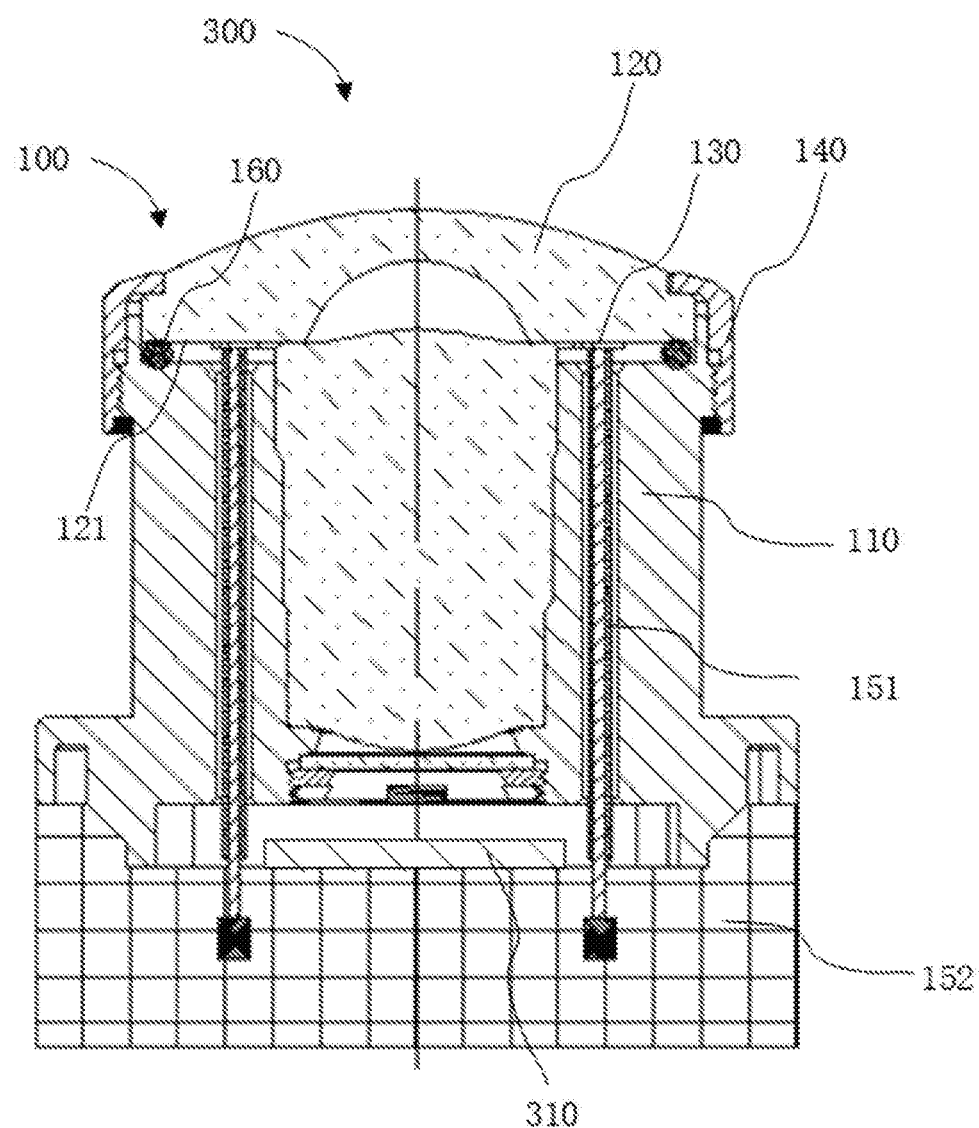
FIG. 10 is a schematic structural diagram of an imaging module according to a third embodiment of the disclosure.

The disclosure further provides an imaging module 300, its schematic structural diagram is shown in FIG. 10. The imaging module 300 includes the camera module (e.g., camera module 100 or 200) of any of the above embodiments, an image sensor 310 and the circuit board 152.

The image sensor 310 can be a Complementary Metal Oxide Semiconductor (CMOS) image sensor, or a Charge Coupled Device (CCD) image sensor.

The circuit board 152 is mounted on an image side of the lens barrel 110, the circuit board 152 include the temperature control system circuit (not shown in drawings), and the circuit board 152 is electrically connected to the heating element 230 or 130 through the electrical conductor 151.

The image sensor 310 is mounted on the circuit board 152, and is received in the image side of the lens barrel 110. The image sensor 310 and the circuit board 150 constitute an image sensor assembly. The image sensor 310 is configured to receive lights passing through the first lens 120 and the lens group 170, and generates image data thereby.

The imaging module 300 may be a vehicle camera, or an outdoor monitor, or any other electronic devices or instruments equipped with the camera module.

The imaging module 300 provided in this embodiment includes the camera module 100 or 200, the camera module 100 or 200 has advantages of simple structure, small space, low cost, direct heating, reliable and stable performance, the imaging module 300 at least has advantages of small structure, low cost and heat for defogging and defrosting automatically, which can be applied to humid or low temperature environments.

Figure 11:
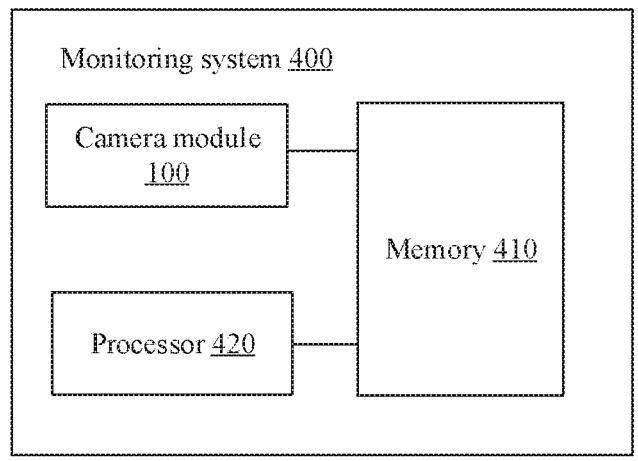
FIG. 11 is a schematic block diagram of a monitoring system according to a fourth embodiment of the present disclosure.

FIG. 11 illustrates a monitoring system 400, which includes the camera module (e.g., the camera module 100) of any of the above embodiments, a memory 410 and a processor 420. The circuit board 152 is coupled to the memory 410 and the processor 420. The camera module 100 is configured for generating image data, and the memory 410 is configured to store the image data, the processor 420 is configured to process the image data.

In some embodiments, the monitoring system 400 further includes a communication unit, the communication unit can be in communication with the processor 420 and a display device, and transmit the optical images processed by the processor 420 to the display device.

Figure 12:
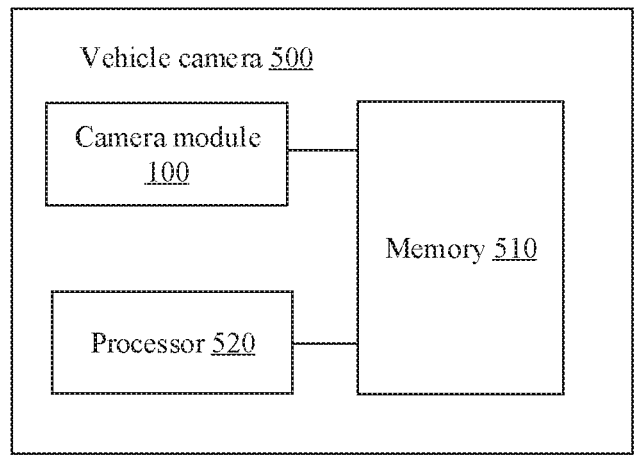
FIG. 12 is a schematic block diagram of a vehicle camera according to a fifth embodiment of the disclosure.
Figure 13:
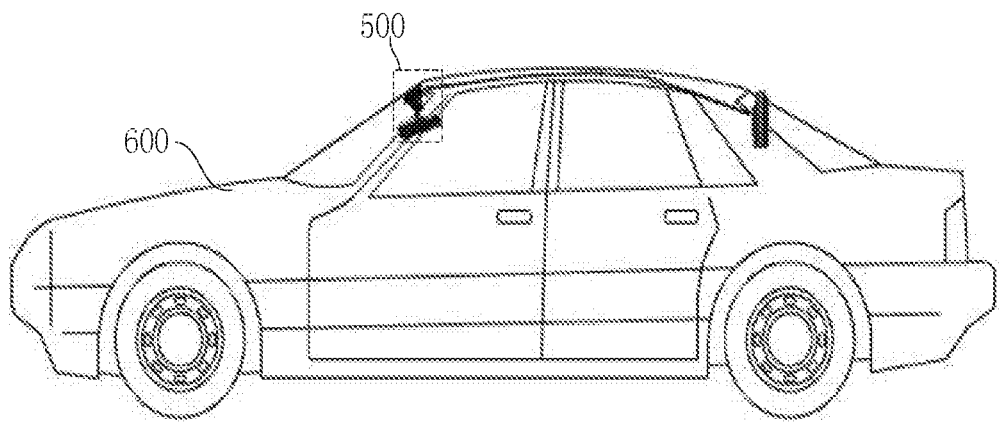
FIG. 13 is a schematic diagram of a vehicle camera according to another embodiment of the disclosure.

FIG. 12 and FIG. 13 illustrate a vehicle camera 500 mounted on a vehicle 600. The vehicle camera 500 may be located outside a front window of the vehicle 600, and includes the camera module (e.g., camera module 100) of any of the above embodiments, a memory 510 and a processor 520. The camera module 100 is configured for capturing optical images, the memory 510 is configured to store the optical images, and the processor 520 is configured to process the optical images. It is noted that the vehicle camera 500 can be mounted at anywhere of the vehicle 600.

In some embodiments, the processor 520 may be electrically connected with a vehicle controller, the processor 520 can process the optical images to form controlling signals, and then transmit the controlling signals to the vehicle controller, thereby the vehicle controller can control the driving of the vehicle.

In summary, the camera module 100 and 200, the imaging module 300, the monitoring system 400, and the vehicle camera 500 provided by the disclosure can heat the first lens 120 automatically for defogging and defrosting, which can be applied to humid or low temperature environments.

The above-mentioned embodiments are merely illustrative of several embodiments of the present disclosure, and the description thereof is more specific and detailed, however is not to be construed as limiting the scope of the disclosure. It should be noted that various variations and modifications may be made by those skilled in the art without departing from the spirit and scope of the disclosure. Therefore, the scope of the disclosure should be determined by the appended claims.

What is claimed is:

1. A camera module, comprising:
a lens barrel, having a light entrance;
a first lens, disposed at the light entrance and having an image side surface; and
a heating element, directly engaging with the image side surface to heat the first lens;
wherein the image side surface of the first lens comprises an optical-effective lateral portion and a non-optical-effective lateral portion surrounding the optical-effective lateral portion, the non-optical-effective lateral portion is provided on an edge region of the first lens, and the heating element is disposed only at the non-optical-effective lateral portion;
the heating element comprises a heating film and a buffer layer, both the heating film and the buffer layer are annular, the heating film is attached to the image side surface of the first lens, and the buffer layer is positioned between the heating film and the lens barrel; and
the heating film comprises two electrical insulating films and a heating resistor layer, the heating resistor layer is sandwiched between the two electrical insulating films.

2. The camera module as claimed in claim 1, wherein the camera module further comprises a front cover, the front cover is engaged with the lens barrel and the first lens, and configured to provide a pressing force to the first lens.

3. The camera module as claimed in claim 2, wherein the lens barrel comprises a barrel body and a protruding side wall adjacent to the object side, the camera module further comprises a lens group received in the barrel body, the first lens is opposite to the lens group and in contact with the protruding side wall.

4. The camera module as claimed in claim 3, wherein the first lens further comprises a side surface and an object side surface, the side surface is connected between the object side surface and the image side surface; the front cover comprises a side portion and a front portion connected to the side portion, the protruding side wall is sandwiched between the side portion and the side surface of the first lens, the front portion is in contact with the object side surface of the first lens.

5. The camera module as claimed in claim 1, wherein the lens barrel defines a first lens mounting cavity, a heating element mounting cavity and a receiving space, the heating element mounting cavity are positioned between and in communication with the first lens mounting cavity and the receiving space, a diameter of the first lens mounting cavity is greater than that of the heating element mounting cavity, a diameter of the heating element mounting cavity is greater than that of the receiving space.

6. The camera module as claimed in claim 5, wherein the camera module further comprises a lens group received in the receiving space, the first lens is mounted in the first lens mounting cavity, the heating element is received in the heating element mounting cavity.

7. The camera module as claimed in claim 1, wherein the camera module comprises a circuit board, the circuit board comprises a positive terminal and a negative terminal, the heating film and the buffer layer define an annular heating portion, the heating element further comprises a first conductive column and a second conductive column, the annular heating portion further comprises a first heating terminal and a second heating terminal, the first conductive column is electrically connected between the first heating terminal and the positive terminal, and the second conductive column is electrically connected between the second heating terminal and the negative terminal.

8. The camera module as claimed in claim 7, wherein the camera module further comprises a lens group in contact with the first lens, the lens barrel defines a first mounting hole, a second mounting hole and a receiving space, the lens group is received in the receiving space, the first mounting hole and the second mounting hole are located at two opposite sides of the receiving space, a central axis of the receiving space is parallel to a central axis of the first mounting hole, the first conductive column extends through the first mounting hole, and the second conductive column extends through the second mounting hole.

9. The camera module as claimed in claim 7, wherein a longitudinal direction of the first conductive column is parallel to an optical axis of the first lens.

10. The camera module as claimed in claim 1, wherein the camera module further comprises a seal ring, the image side surface comprises a curved surface and an annular flat surface perpendicular to an optical axis of the first lens, the non-optical-effective lateral portion is provided on the annular flat surface, the lens barrel further comprises an end surface parallel to the annular flat surface, the heating element is attached to the annular flat surface, the seal ring is disposed between the image side surface and the end surface, a gap is defined between the annular flat surface and the end surface.

11. The camera module as claimed in claim 10, wherein the annular flat surface comprises an engaging portion, a heating portion and a periphery portion, the camera module further comprises a lens group received in the lens barrel, the lens group is opposite to the curved surface and is in contact with the engaging portion, the heating element is in contact with the heating portion, the heating portion is connected and located between the engaging portion and the periphery portion, the periphery portion is spaced apart from the end surface and engaged with the seal ring.

12. The camera module as claimed in claim 1, wherein the lens barrel comprises a barrel body and a protruding side wall, the barrel body comprises an end surface, the protruding side wall extends form the end surface toward the object side, the protruding side wall and the side surface form a first lens mounting cavity, the first lens is mounted in the first lens mounting cavity, a seal ring is disposed between the image side surface and the end surface, a gap is defined between the image side surface and the end surface, the heating element is adhered to the image side surface and exposed in the gap.

13. The camera module as claimed in claim 1, wherein the lens barrel comprises a barrel body and a protruding side wall connected with the barrel body, the barrel body comprises an inner surface and an end surface, the inner surface is an inner peripheral surface of the barrel body, the end surface is connected with the inner surface and is an inner platform for supporting the first lens, the protruding side wall protrudes from the end surface toward an object side, the protruding side wall surrounds the end surface, and a first lens mounting cavity is defined and surrounded by the protruding side wall and the end surface.

14. The camera module as claimed in claim 13, wherein the lens barrel further comprises a supporting surface and a connecting surface, the supporting surface is parallel to the end surface and is connected between the connecting surface and the inner surface, the connecting surface is connected between the end surface and the supporting surface and is parallel to an optical axis of the first lens, the end surface and the supporting surface are perpendicular to the connecting surface, the connecting surface surrounds the supporting surface, and a heating element mounting cavity is defined and surrounded by the connecting surface and the supporting surface, a diameter of the first lens mounting cavity being greater than a diameter of the heating element mounting cavity.

15. A monitoring system, comprise a camera module, a memory and a processor, wherein the camera module is configured for generating image data, the memory is configured for storing the image data, the processor is configured for processing the image data, and the camera module comprises:
  a lens barrel, comprising a receiving space and a light entrance communicated with the receiving space;
  a lens group, received in the receiving space;
  a first lens, disposed at the light entrance and having an image side surface, wherein the image side surface comprises a curved surface opposite to the lens group and an annular flat surface connected to the curved surface;
  a front cover, engaged with the lens barrel and the first lens; and
  a heating element, attached to the annular flat surface and configured to heat the first lens;
  wherein the image side surface of the first lens comprises an optical-effective lateral portion and a non-optical-effective lateral portion surrounding the optical-effective lateral portion, the non-optical-effective lateral portion is provided on the annular flat surface, and the heating element is disposed only at the non-optical-effective lateral portion;
  the heating element comprises a heating film and a buffer layer, both the heating film and the buffer layer are annular, the heating film is attached to the image side surface of the first lens, and the buffer layer is positioned between the heating film and the lens barrel; and the heating film comprises two electrical insulating films and a heating resistor layer, the heating resistor layer is sandwiched between the two electrical insulating films.

16. The monitoring system as claimed in claim 15, wherein the lens barrel comprises a barrel body and a protruding side wall adjacent to the object side, the first lens further comprises a side surface and an object side surface, the side surface is connected between the object side surface and the image side surface; the front cover comprises a side portion and a front portion connected to the side portion, the protruding side wall is sandwiched between the side portion and the side surface of the first lens, the front portion is in contact with the object side surface of the first lens.

17. The monitoring system as claimed in claim 15, wherein the lens barrel comprises a barrel body and a protruding side wall connected with the barrel body, the barrel body comprises an inner surface and an end surface, the inner surface is an inner peripheral surface of the barrel body, the end surface is connected with the inner surface and is an inner platform for supporting the first lens, the protruding side wall protrudes from the end surface toward an object side, the protruding side wall surrounds the end surface, and a first lens mounting cavity is defined and surrounded by the protruding side wall and the end surface; and
  the lens barrel further comprises a supporting surface and a connecting surface, the supporting surface is parallel to the end surface and is connected between the connecting surface and the inner surface, the connecting surface is connected between the end surface and the supporting surface and is parallel to an optical axis of the first lens, the end surface and the supporting surface are perpendicular to the connecting surface, the connecting surface surrounds the supporting surface, and a heating element mounting cavity is defined and surrounded by the connecting surface and the supporting surface, a diameter of the first lens mounting cavity being greater than a diameter of the heating element mounting cavity.

18. The monitoring system as claimed in claim 15, wherein the camera module further comprises a circuit board, the circuit board comprises a positive terminal and a negative terminal;
  the heating element further comprises a first conductive column and a second conductive column, each of the first conductive column and the first conductive column extends along a direction parallel to an optical axis of the first lens;
  the lens barrel is provided therein with a first mounting hole to receive the first conductive column and with a second mounting hole to receive the second conductive column, each of the first mounting hole and the second mounting hole penetrates through the lens barrel, the first mounting hole and the second mounting hole are located at two opposite sides of the receiving space, a central axis of each of the first mounting hole and the second mounting hole is parallel to a central axis of the receiving space, the first conductive column extends through the first mounting hole for connection with one of the positive terminal and the negative terminal, and the second conductive column extends through the second mounting hole for connection with another one of the positive terminal and the negative terminal.

19. A vehicle camera, comprising a camera module, a memory and a processor, the camera module is configured for capturing optical images, the memory is configured for storing the optical images, the processor is configured for processing the optical images, and the camera module comprising:

a lens barrel, having a light entrance;

a first lens, disposed at the light entrance and having an image side surface;

a front cover, engaged with the lens barrel and the first lens;

a circuit board, having a positive terminal and a negative terminal; and a heating element, having an annular heating portion, a first conductive column and a second conductive column, the annular heating portion is in contact with the image side surface and comprises a first heating terminal and a second heating terminal, the first conductive column is electrically connected between the first heating terminal and the positive terminal, and the second conductive column is electrically connected between the second heating terminal and the negative terminal;

wherein the image side surface of the first lens comprises an optical-effective lateral portion and a non-optical-effective lateral portion surrounding the optical-effective lateral portion, the non-optical-effective lateral portion is an edge region of the first lens, and the heating element is disposed only at the non-optical-effective lateral portion;

the heating element comprises a heating film and a buffer layer, both the heating film and the buffer layer are annular, the heating film is attached to the image side surface of the first lens, and the buffer layer is positioned between the heating film and the lens barrel; and the heating film comprises two electrical insulating films and a heating resistor layer, the heating resistor layer is sandwiched between the two electrical insulating films.

20. The vehicle camera as claimed in claim 19, wherein the lens barrel comprises a barrel body and a protruding side wall connected with the barrel body, the barrel body comprises an inner surface and an end surface, the inner surface is an inner peripheral surface of the barrel body, the end surface is connected with the inner surface and is an inner platform for supporting the first lens, the protruding side wall protrudes from the end surface toward an object side, the protruding side wall surrounds the end surface, and a first lens mounting cavity is defined and surrounded by the protruding side wall and the end surface; and the lens barrel further comprises a supporting surface and a connecting surface, the supporting surface is parallel to the end surface and is connected between the connecting surface and the inner surface, the connecting surface is connected between the end surface and the supporting surface and is parallel to an optical axis of the first lens, the end surface and the supporting surface are perpendicular to the connecting surface, the connecting surface surrounds the supporting surface, and a heating element mounting cavity is defined and surrounded by the connecting surface and the supporting surface, a diameter of the first lens mounting cavity being greater than a diameter of the heating element mounting cavity.

* * * * *